(12) United States Patent
Lammersen et al.

(10) Patent No.: US 12,512,186 B2
(45) Date of Patent: Dec. 30, 2025

(54) METHOD AND SYSTEM FOR PROCESS CONTROL

(71) Applicant: Evonik Operations GmbH, Essen (DE)

(72) Inventors: Thomas Lammersen, Boeblingen (DE); Benny Hartono, Singapur (SG); Hans-Joachim Hasselbach, Gelnhausen (DE); Danny De Corte, Sint-Niklaas (BE)

(73) Assignee: Evonik Operations GmbH, Essen (DE)

( * ) Notice: Subject to any disclaimer, the term of this patent is extended or adjusted under 35 U.S.C. 154(b) by 718 days.

(21) Appl. No.: 17/904,252

(22) PCT Filed: Feb. 18, 2021

(86) PCT No.: PCT/EP2021/054040
§ 371 (c)(1),
(2) Date: Aug. 15, 2022

(87) PCT Pub. No.: WO2021/165406
PCT Pub. Date: Aug. 26, 2021

(65) Prior Publication Data
US 2023/0100001 A1    Mar. 30, 2023

(30) Foreign Application Priority Data
Feb. 20, 2020   (EP) .................... 20158533

(51) Int. Cl.
*G16C 20/10*   (2019.01)
*B01D 53/14*   (2006.01)
(Continued)

(52) U.S. Cl.
CPC ......... *G16C 20/10* (2019.02); *B01D 53/1412* (2013.01); *B01D 53/346* (2013.01);
(Continued)

(58) Field of Classification Search
CPC .............. G05B 13/027; G05B 19/4155; G05B 2219/32287; B01D 53/346; B01D 53/1412; B01D 53/58; G16C 20/10; G16C 20/70
See application file for complete search history.

(56) References Cited

U.S. PATENT DOCUMENTS

| | | | |
|---|---|---|---|
| 5,539,638 A * | 7/1996 | Keeler | G05B 17/02 701/33.9 |
| 6,597,958 B1 * | 7/2003 | Starr | G05B 23/0243 703/2 |

(Continued)

FOREIGN PATENT DOCUMENTS

| | | |
|---|---|---|
| EP | 0 712-463 B1 | 4/1999 |
| JP | 9504346 A | 4/1997 |

(Continued)

OTHER PUBLICATIONS

Plamen Angelov et al: "Evolving fuzzy inferential sensors for process industry", Genetic and Evolving Systems, 2008. GEFS 2008. 3rd International Workshop on, IEEE, Mar. 4, 2008 (Mar. 4, 2008), pp. 41-46, XP031241742.

(Continued)

*Primary Examiner* — Shogo Sasaki
(74) *Attorney, Agent, or Firm* — Oblon, McClelland, Maier & Neustadt, L.L.P.

(57) ABSTRACT

A method for controlling a chemical process, by preparing methanol, hydrogen sulfide, methyl mercaptan, hydrocyanic acid, acrolein, 3-methylthiopropionaldehyde, 5-(2-methyl-mercaptoethyl)-hydantoin, methionine, a salt of methionine, and a derivative of methionine. The method includes providing a training set TS1, wherein TS1 is process values PV1 and process values PV2 being correlated to one another, and/or laboratory values LV1 and process values PV2 being correlated to one another. The method includes training a (Continued)

processing unit on the training set TS1 to identify a pattern of correlation between one or more measured process variables and at least one process variable. The method includes developing a calibration function CF1 for a calibrated soft sensor from the identified pattern of correlation and predicting at least one operating parameter for the chemical process as an approximation to LV1 and/or PV1. A system for controlling a chemical process.

14 Claims, 6 Drawing Sheets

(51) Int. Cl.
| | | |
|---|---|---|
| *B01D 53/34* | (2006.01) | |
| *B01D 53/58* | (2006.01) | |
| *G05B 19/4155* | (2006.01) | |
| *G16C 20/70* | (2019.01) | |

(52) U.S. Cl.
CPC ......... *B01D 53/58* (2013.01); *G05B 19/4155* (2013.01); *G16C 20/70* (2019.02); *G05B 2219/32287* (2013.01)

(56) References Cited

U.S. PATENT DOCUMENTS

| | | | |
|---|---|---|---|
| 9,529,348 B2* | 12/2016 | Kephart | G05B 19/41885 |
| 10,235,481 B2 | 3/2019 | Trygstad | |
| 10,545,482 B2* | 1/2020 | Dash | G05B 17/02 |
| 11,853,032 B2* | 12/2023 | Chan | G05B 19/4155 |
| 11,857,939 B2* | 1/2024 | Lusk | G05B 13/048 |
| 2004/0260421 A1* | 12/2004 | Persson | D21G 9/0018 |
| | | | 162/263 |
| 2014/0214733 A1 | 7/2014 | Alonso et al. | |
| 2016/0026171 A1* | 1/2016 | Dash | G05B 17/02 |
| | | | 700/267 |
| 2017/0269559 A1 | 9/2017 | Trygstad | |
| 2018/0353925 A1* | 12/2018 | Giiazov | B01J 19/0006 |
| 2020/0012265 A1* | 1/2020 | Thomsen | G06F 3/0481 |
| 2020/0379442 A1* | 12/2020 | Chan | B01J 19/0033 |
| 2022/0072500 A1* | 3/2022 | Lusk | C02F 1/686 |
| 2022/0260980 A1* | 8/2022 | Andreu | G06N 20/00 |
| 2022/0397886 A1* | 12/2022 | Hong | G16C 20/10 |

FOREIGN PATENT DOCUMENTS

| | | |
|---|---|---|
| JP | 2009-282804 A | 12/2009 |
| JP | 2016-507113 A | 3/2016 |
| WO | WO 01/25863 A1 | 4/2001 |

OTHER PUBLICATIONS

Kadlec P et al: "Review of adaptation mechanisms for data-driven soft sensors", Computers & Chemical Engineering, vol. 35, No. 1, Jan. 10, 2011, pp. 1-24, XP027527282.

Yuan Xiaofeng et al: "A Comparative Study of Adaptive Soft Sensors for Quality Prediction in an Industrial Refining Hydrocracking Process", 2018 IEEE 7th Data Driven Control and Learning Systems Conference (DDCLS), IEEE, May 25, 2018, pp. 1064-1068, XP033432545.

International Search Report mailed on Apr. 23, 2021 in PCT/EP2021/054040 filed on Feb. 18, 2021 (6 pages).

Written Opinion mailed on Apr. 23, 2021 in PCT/EP2021/054040 filed on Feb. 18, 2021 (11 pages).

European Search Report dated Jul. 10, 2020 in European Application 20158533.8 filed on Feb. 20, 2020 (12 pages).

Office Action dated Aug. 4, 2025, issued in counterpart CN Application No. 202180015680.2, citing documents No. 1, with English Translation. (16 pages).

* cited by examiner

METHOD AND SYSTEM FOR PROCESS CONTROL

CROSS REFERENCE TO RELATED APPLICATIONS

This application is a National Stage entry under 35 U.S.C. § 371 of PCT/EP2021/054040, filed on Feb. 18, 2021, and claims priority to European Patent Application No. 20158533.8, filed on Feb. 20, 2020, the entire contents of which are incorporated herein by reference.

The present invention is on the field of process control, in particular on the field of controlling a chemical process, specifically a process that is one or more of the preparation of methanol, hydrogen sulfide, methyl mercaptan, hydrocyanic acid, acrolein, 3-methylthiopropionaldehyde, 5-(2-methyl-mercaptoethyl)-hydantoin, methionine, a salt of methionine, and a derivative of methionine. Process control is a combination of control engineering and chemical engineering disciplines that uses industrial control systems to achieve a level of product consistency, economy and safety which could not be achieved purely by human manual control. It is implemented widely in industries such as oil refining, pulp and paper manufacturing, chemical processing and power generating plants. There is a wide range of size, type and complexity, but it enables a small number of operators to manage complex processes to a high degree of consistency. The development of large automatic process control systems was instrumental in enabling the design of large high volume and complex processes, which could not be otherwise economically or safely operated. The applications can range from controlling the temperature and level of a single process vessel, to a complete chemical processing plant with several thousand control loops.

Process control of large industrial plants has evolved through many stages. Initially, control was from panels local to the process plant. However, this required a large manpower resource to attend to these dispersed panels, and there was no overall view of the process. The next logical development was the transmission of all plant measurements to a permanently-manned central control room. Effectively this was the centralization of all localized panels, with the advantages of lower manning levels and easier overview of the process. Often the controllers were behind the control room panels, and all automatic and manual control outputs were transmitted back to the plant. However, whilst providing a central control focus, this arrangement was inflexible as each control loop had its own controller hardware, and continual operator movement within the control room was required to view different parts of the process.

With the coming of electronic processors and graphic displays it became possible to replace these discrete controllers with computer-based algorithms, hosted on a network of input/output racks with their own control processors. These could be distributed around the plant and communicate with the graphic display in the control room or rooms. Thus, the distributed control system was born.

The introduction of distribution control system (DCS) allowed easy interconnection and re-configuration of plant controls such as cascaded loops and interlocks, and easy interfacing with other production computer systems. It enabled sophisticated alarm handling, introduced automatic event logging, removed the need for physical records such as chart recorders, allowed the control racks to be networked and thereby located locally to plant to reduce cabling runs, and provided high level overviews of plant status and production levels.

In addition, the introduction of the DCS enabled the application of more sophisticated control methods, which use mathematical optimization to compute the best operating parameter matching given constraints. However, it needs a control model for controlling a processing with a computer and a DCS, in particular for predicting the behavior of the system in question. The control model is a set of equations used to predict the behavior of a system and can help determine what the response to a change will be. To determine the fundamental model for any process, the inputs and outputs of the system are defined differently than for other chemical processes. For example, the balance equations are defined by the control inputs and outputs rather than the material inputs. The state variable (x) is a measurable variable that is a good indicator of the state of the system, such as temperature (energy balance), volume (mass balance) or concentration (component balance). The input variable (u) is a specified variable that commonly includes flow rates.

Therefore, industrial processing plants are usually heavily equipped with many sensors. The primary purpose of the sensors is to deliver data for process monitoring and control. Some decades ago, researchers started to make use of the large amounts of data measured and stored in the process industry by building predictive models based on this data. However, it still needs measured data for making prediction on the behavior of the system in question. A further issue in this respect is that the measurement of certain parameters in a processing plant is often rather difficult, i.e. time consuming, complex, or even not possible at all. Here, so-called soft sensors provide support. A soft sensor, composed of the words software and sensor, is a virtual sensor. Hence, it is not a really existing sensor but a simulation of the dependency of representative individual metrics or measured values to a target value. Therefore, the target value is not directly measured but calculated or approximated by means of a measured value correlating to the target value and a model of this correlation. At a very general level one can distinguish two different classes of soft sensors, namely model driven and data driven soft sensors. Typically, model driven soft sensors describe the physical and chemical background of the process. However, a sincere drawback of these models is that they are developed primarily for the planning and design of the processing plant, and therefore, usually focus on the description of the ideal steady-states of the processes. Consequently, they do not reflect real world situations, which are not characterized by ideal steady-states of processes but of constantly and in particular, surprisingly changing states of processes. Hence, model driven soft sensors require a considerable amount of engineering to response to disturbances. This results in a big complexity and sometimes it is not possible to consider all disturbances, in particular, when they are not known in total and when the reasons for the occurrence of the disturbances are not known. This limits the use of model driven soft sensors for controlling chemical plants. By comparison, data-driven soft sensors are based on the data measured within the processing plants, and thus, they describe the real process conditions more realistic than model-driven soft sensors.

Notwithstanding, it is necessary to maintain and tune a soft sensor and even a data-driven soft sensor on a regular basis. The maintenance is necessary due to the drifts and other changes of the data, which cause the performance of the soft sensor to deteriorate. Therefore, the soft sensor must be compensated for by adapting or re-developing the model. However, the current soft sensors do not provide any automated mechanism for their maintenance. It is therefore still necessary to manually control and maintain a soft sensor. And as if that were not bad enough, there is still no acceptable absolute measure for assessing the soft sensor quality level. Hence, the judgement if a model works well or not is still dependent on the model operator's subjective perception based on visual interpretation of the deviation between the corrected target value and its prediction. This however requires an extensive experience on the controller's part. Even worse, it does not prevent the controller from making the wrong decision because his judgement is only based on his subjective perception and not on an objective assessment on a higher-level context. Things get even more complex when it comes to a chemical process which represents a multi-step preparation of a chemical. Such a multi-step process is for example the preparation of methionine which involves the preparation of several starting compounds and intermediate compounds.

Accordingly, there was a need for a method which allows for an automatic control of a chemical process, wherein the chemical process is one or more of the preparation of methanol, hydrogen sulfide, methyl mercaptan, hydrocyanic acid, acrolein, 3-methylthiopropionaldehyde, 5-(2-methyl-mercaptoethyl)-hydantoin, methionine, a salt of methionine, and a derivative of methionine, by means of a soft sensor, wherein the soft sensor is automatically re-calibrated.

It is was found that this problem is solved in that an automatically re-calibrating soft sensor is implemented in the framework for controlling the chemical process. In detail, the calibrated soft sensor, obtained by training a processing unit on a training set of process values and laboratory values being correlated to one another and/or one group of process values and another group of process values being correlated to one another, is automatically re-calibrated when there is deviation between an operating parameter, predicted for one or more process values, correlated to a process and/or laboratory value, as an approximation to a laboratory value or a process value, and the corresponding laboratory value and/or processing value. Specifically, in that case the original training set used for providing the calibrated soft sensor is augmented by further laboratory and/or process values, and the processing unit is trained on the thus obtained augmented training set to give a revised calibration function, with the aid of which the soft sensor is re-calibrated. The thus obtained re-calibrated soft sensor is then used for predicting the process parameter for controlling the chemical process. When there is no deviation between the predicted process parameter and the corresponding laboratory value, the predicted parameter for operating the chemical process is written into the distributed control system (DCS) of the process.

One object of the present invention is therefore a method for controlling a chemical process, wherein the chemical process is one or more of the preparation of methanol, hydrogen sulfide, methyl mercaptan, hydrocyanic acid, acrolein, 3-methylthiopropionaldehyde, 5-(2-methylmercapto-ethyl)-hydantoin, methionine, a salt of methionine, and a derivative of methionine, comprising the steps of a) providing a training set TS1, wherein said training set TS1 comprises process values PV1 and process values PV2 being correlated to one another, and/or laboratory values LV1 and process values PV2 being correlated to one another, b) training a processing unit on the training set TS1 of step a) to identify a pattern of correlation between one or more measured process variables and at least one process variable, and developing a calibration function CF1 for a calibrated soft sensor from the identified pattern of correlation, c) predicting at least one operating parameter for the chemical process as approximation to LV1 and/or PV1, comprising the steps of c1) requesting one or more process values corresponding to PV2 from the distributed control system (DCS) of the chemical process, and c2) predicting an operating parameter with the value of step c1) by means of the calibrated soft sensor of step b), d) calculating a deviation as being the difference between the operating parameter predicted in step c2) and the corresponding laboratory value LV1 and/or the processing value PV1 of the training set TS1 of step a), e) proceeding with step f) if the deviation calculated in step d) exceeds a threshold value, otherwise proceeding with step g), f) re-calibrating the soft sensor of step b), comprising the steps of f1) augmenting the training set TS1 of step a) with further laboratory values LV1 and/or further process values PV1 or replacing at least a part of the training set TS1 with the further laboratory values LV1 and/or further process values PV1 to provide a training set TS2, f2) training the processing unit of step b) on the augmented training set TS1 or on the training set TS2 of step f1) to revise the calibration function of step b), f3) re-calibrating the soft sensor of step b) by means of the revised calibration function of step f2), and f4) returning to step c) using the re-calibrated soft sensor of step f3), g) writing the at least one operating parameter predicted in step c2) into the DCS, and h) repeating the steps c) to g).

Figure 1:
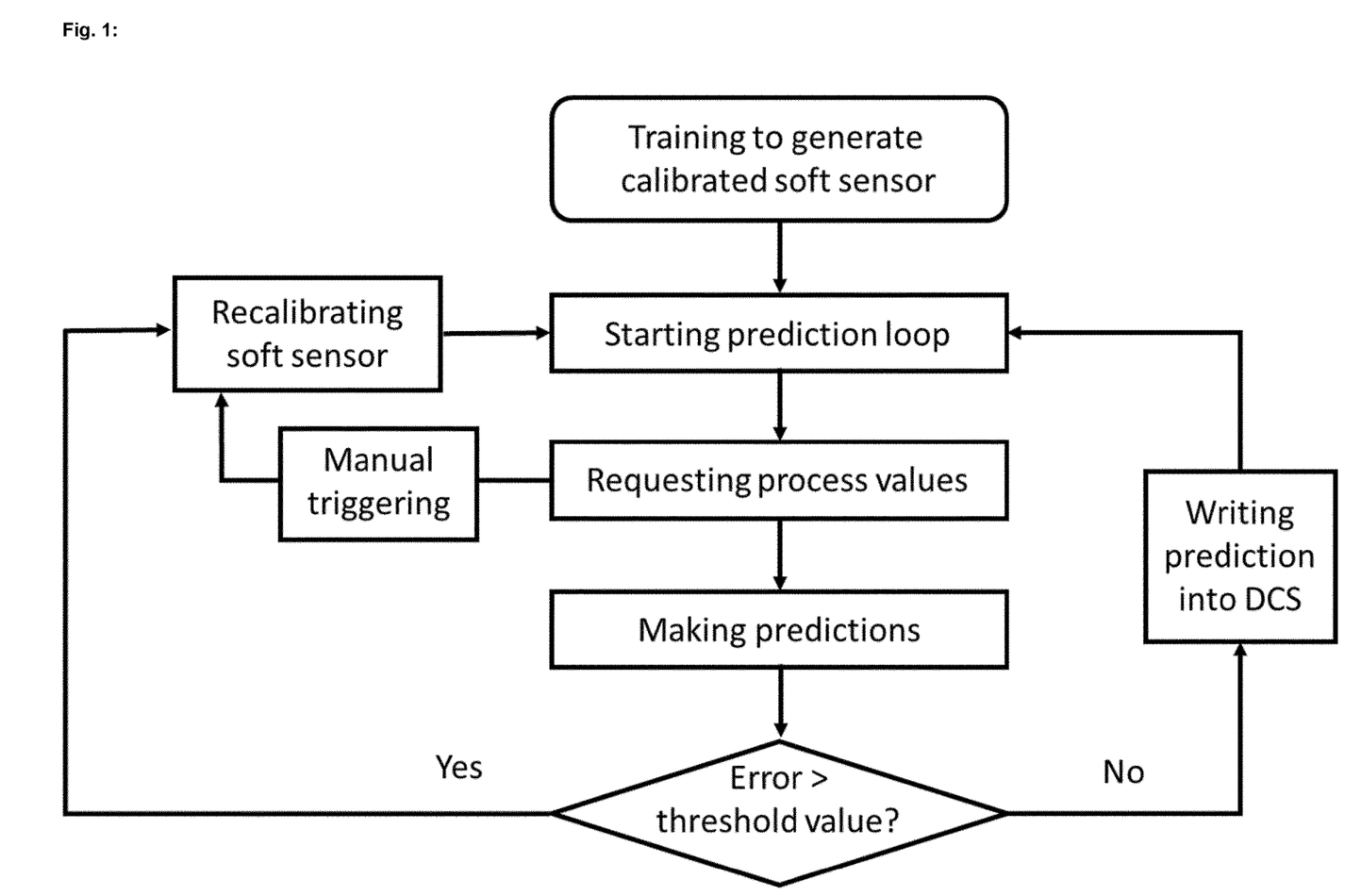
FIG. 1 is a flow diagram of the method according to the present invention.

The process according to the present invention is also illustrated in FIG. 1.

There is no need to continuously perform the method according to the present invention. Rather, it is suitable to take a break after the at least one operating parameter predicted in step c2) has been written into the DCS in step g). This also allows the respective system of the chemical process to get a stable state. Preferably, the method according to the present invention is run periodically in intervals from one to ten minutes, e.g. every minute, every two minutes, every three minutes, every four minutes3 every five minutes, every six minutes, every seven minutes, every eight minutes, every nine minutes or every ten minutes. It is further preferred that the method is run periodically in the same time intervals in at least the same phases of the chemical process in question. However, it makes sense to change the time intervals, when going from one specific phase of the chemical process in question to another phase because this may lead to significant changes in the chemical process.

In the context of the present invention the term soft sensor is used as known to the person skilled in the art and denotes the predictive models based on the data being measured and stored in process industry. This term is a combination of the words "software", because the models are usually computer programs, and "sensor", because the models deliver similar information as their hardware counterparts. In principle, a soft sensor is a mathematical function of any shape depending on its structure and the training or learning algorithm used for its creation.

According to the present invention at least one operating parameter for the chemical process is predicted in step c) of said method as approximation to LV1 and/or PV1. This allows to compare the predicted value, i.e. the operating parameter predicted in step c), with the expected value, i.e. the corresponding laboratory value LV1 and/or the processing value PV1 of the training set TS1 of step a), in step d), where a deviation is calculated as the difference between the predicted value, i.e. the operating parameter predicted in step c), and the expected value, i.e. the corresponding laboratory value LV1 and/or the processing value PV1.

In detail, the step c) comprises that one or more process values are requested from the distributed control system (DCS) of the chemical process, wherein said one or more process values correspond to PV2. Accordingly, the process values requested in step c1) are also correlated to the laboratory values LV1 and/or the process values PV1. Therefore, the soft senor based on the calibration function CF1 generated on the correlation between the laboratory values LV1 and the process values PV2 and/or between the process values PV1 and the process values PV2 is suitable to make predictions of at least one operating parameter as approximation to LV1 and/or PV1.

In principle, the method according to the present invention exploits historical data to extract correlations between process variables. Specifically, a processing unit is trained with a training set of historical data, i.e. values of the process variables being correlated to one another, to identify a pattern of correlations between one or more measured process variables and at least one process variable, to be predicted or to be approximated. Next, an equation, i.e. calibration function for the soft sensor, is developed from the identified pattern of correlation between the one or more measured process variables and the at least one process variable, to be predicted or to be approximated. For developing said equation, i.e. calibration function, it needs an appropriate training set. In detail, a training set T1 is provided in step a), comprising process values PV1 and process values PV2 being correlated to one another, and/or laboratory values LV1 and process values PV2 being correlated to one another. The first step of building the training set is the collecting of values being correlated to one another, i.e. laboratory values LV1 and process values PV2, process values PV1 and process values PV2 or both pairings.

In order to reflect changes in the progress of the process in question in a proper way, it is beneficial to have a proper chronological assignment of the values which are correlated to one another. Therefore, each value, i.e. each laboratory value LV1, each process value PV1 and each process value PV2, is provided with a time stencil indicating the point in time at which the value was recorded and/or the sample underlying said value was taken. It is also beneficial to establish a chronological sequence of the said values. For this purpose, each laboratory value LV1 and/or each process value PV1 is provided with a time pattern, going back in time from the time stencil of LV1 and/or PV1 for a pre-defined time span. The present invention is not subject to any limitation regarding the pre-defined time span. Rather, the pre-defined time span is chosen under consideration of the individual periodic changes of the correlated values. For example, the value of an excess acid having an effect of the pH value is/are collected every 15, 30, 45 or 60 minutes depending on the individual situation, i.e. the distance between the point of adding the excess acid, the point where the pH value has to be known, and the resulting distribution of the acid in the connecting system. Finally, correlated values are then linked when the time stencil of the values match the time pattern of the corresponding correlated values. Specifically, a process value PV2 is linked to a laboratory value LV1 and/or process value PV1, when the time stencil of the process value PV2 matches the time pattern of the laboratory value LV1 and/or process value PV1. For example, process values having time stencils of 12:15, 12:30, 12:45 etc. match to a laboratory value LV1 with a time pattern of 15 minutes and therefore, are linked.

In an embodiment the method according to the present invention the steps a) and/or f1) further comprise the steps of A1) collecting laboratory values LV1 and process values PV2, and/or process values PV1 and process values PV2, A2) providing each value of step A1) with a time stencil indicating the point in time at which the value was recorded and/or the sample underlying said value was taken, A3) providing each laboratory value LV1 and/or each process value PV1 with a time pattern, going back in time from the time stencil of LV1 and/or PV1 for a pre-defined time span, and A4) linking a laboratory value LV1 and/or a process value PV1 to one or more process values PV2 having a time stencil matching the time pattern of the laboratory value LV1 and/or the time pattern of the process value PV1.

In the context of the present invention two values are correlated to one another, when one value is dependent or influenced by the other value. An example for a process value dependent or influenced by a laboratory value is the dependency of the pH value from an excess of an acid. An example for a process value having an influence on a laboratory value is the dependency of acid dosing on the excess of the acid. In the context of the present invention one may pick a laboratory value LV1 and/or a process value PV1 for which a prediction or approximation to a process value PV2 is to be made. Next, a list of tags is created which are a) dependent or influenced by the laboratory value, e.g. the pH value is dependent on the acid excess, or b) will have an impact on the laboratory value, e.g. acid dosing has an impact on the acid excess. According to this procedure, one can collect the laboratory values LV1 correlated to process values PV2 and/or process values PV1 correlated to process values PV2.

In another embodiment of the method according to the present invention, i) a process value PV1 and a process value PV2 are correlated to one another, when the process value PV1 is dependent or influenced by the process value PV2, or vice versa, and/or ii) a laboratory value LV1 and a process value PV2 are correlated to one another, when the laboratory value LV1 is dependent or influenced by the process value PV2, or vice versa.

Specifically, process values PV2 are collected which allow for a correlation to laboratory values LV1 and/or process values PV1. Accordingly, the laboratory values LV1 and the process values PV2 being correlated to another, are adequately chosen depending on the chemical process to be controlled. Likewise, the process values PV1 and process values PV2 being correlated to another are adequately chosen depending on the chemical process to be controlled. For example, if the laboratory value LV1 or the process value PV1 did relate to the excess of acid, the process value PV2 would be the pH value. For example, if the laboratory value LV1 or the process value PV1 did relate to the concentration of an ion, the process value PV2 would be the ion conductivity of the respective medium, e.g. the conductivity of salt of methionine in the respective medium. For example, if the laboratory value LV1 or the process value PV1 did relate to the concentration of a specific organic compound to be prepared, e.g. methanol, methyl mercaptan, acrolein, 3-methylthioprionaldehyde, methionine, or a derivative of methionine, such as 2-hydroxy-4-(methylthio) butyric acid, which is the hydroxy-analogue of methionine, the process value PV2 would be the intensity of characteristic absorption bands (in IR, NIR, UV or Raman spectrometry) of the organic compound in question. Alternatively, if the laboratory value LV1 or the process value PV1 did relate to the concentration of a specific organic compound which is the starting compound for a compound, to be prepared, e.g. propene for acrolein, methanol or hydrogen sulfide for methyl mercaptan, 5-(2-Methylmercaptoethyl)-hydantoin for methionine, the process value PV2 would be the intensity of characteristic absorption bands (in IR, NIR, UV or Raman spectrometry) of the organic starting compound in question. For example, it the laboratory value LV1 or process value PV1 was the concentration of oxygen, the process value PV2 would be the oxygen value obtained from an electrochemical measurement, e.g. amperometric measurement or a resistance measurement, or from an optical measurement, e.g. absorption or fluorescence measurement.

Preferably, laboratory values LV1 and/or the process value PV1 is one or more of the group of excess of acid, concentration of an ion, concentration of a specific organic compound to be prepared, e.g. methanol, methyl mercaptan, acrolein, 3-methylthioprionaldehyde, methionine, or a derivative of methionine, such as 2-hydroxy-4-(methylthio) butyric acid, and concentration of oxygen, and the process value PV2 is the pH value, ion conductivity, the intensity of characteristic absorption bands (in IR, NIR, UV or Raman spectrometry) of the organic compound in question, and the oxygen value obtained from an electrochemical measurement, e.g. amperometric measurement or a resistance measurement, or from an optical measurement, e.g. absorption or fluorescence measurement.

The respective process values may be either current values, i.e. values immediately obtained from measurements in the running process, or averaged values, i.e. values at different points in time and collected over a time period, which were then averaged to give a single value.

In a further embodiment of the method according to the present invention the process values are current values or averaged values.

The use of averaged process values gives the benefit of lower noise than current process values. It is therefore preferred that the process values in the method according to the present invention are averaged process values.

In a preferred embodiment of the method according to the present invention the averaged values are obtained by averaging aggregated process values over a pre-defined time span.

It is beneficial when the averaged values also meet the requirement that the time stencil of the averaged process values PV2 matches the time pattern of the laboratory values LV1 and/or process values PV1. It is therefore preferred to average aggregated or collected process values over the pre-defined time span of step A4.

In an alternative preferred embodiment of the method according to the present invention the averaged values are obtained by averaging aggregated process values over the pre-defined time span of step A4.

In addition, the training in step b) of the method according to the present invention may also consider residence time of relevant components, such as the aforementioned starting compounds for the compounds to be prepared or the compounds to be prepared. Said residence times may be either measured or may be obtained from equations, specifically as the quotient of the reactor volume or the apparatus volume to the exiting volume stream. This approach allows to consider time shifts in the chemical reactions.

In this case, the procedure for training in step b) may comprise the following steps:

Step 1: create a training set TS for a specific time period T of historical data with sampling frequency f_s (e.g. every 1 to 10 minutes a sample).

Step 1.1: considering residence times in the process to introduce time delays in the training set Case A: no residence times are considered in the creation of the training set, and thus, no time delays will be introduced between the process values of different process tags.

Case B: residence times are considered, said residence times are assumed to be constant over the whole time.

Case C: a list of process value tags will be used to derive the residence times by means of the respective formulae. The residence times are time-dependent due to process dynamical and tank level fluctuations.

Step 1.2: A time period T=T2−T1 with T1 being the start time and T2 being the end time is set.

Case A: no actions are taken

Case B: no actions are taken

Case C: process values PV2 of process value tags are read for T=T2−T1−TR, with TR being larger than the largest assumed or given residence time in the process. This gives the set TPVR, where TPVR=PVR(TR) and sample points: start time, . . . , start time+TR as per chosen sample frequency.

A list of process tags (PVL) which correlates to the laboratory value LV, i.e. the target value of the soft sensor is provided, heuristically compiled or obtained based on statistical methods, e.g. principal component analysis. Laboratory values are collected over time T. The sampling frequency for the laboratory values, f_sl is in most cases much smaller than f_s, e.g. f_sl=¼ h. It holds f_sl<<f_s. Historical process values using process tags are read in TR leading to the set TPVL.

Step 1.3: introduction of time delays

Case A: no actions

Case B: time delays in TPVL are introduced according to the constant residence times provided Case C: for each time stamp residence times are derived using TPVR. Time delays in TPVL are introduced according to the derived residence times.

Step 1.4: TPVL is aligned to the time stamps of the laboratory values LV. If for the time of a laboratory value LVi, t_LVi, and the time stamp of a sample of TPVL, t_TPVL, holds: t_TPVL<t_LVi and |t_TPVL−t_LVi|<T_L, the laboratory value LV is assigned to the sample of TPVL, and the measured or derived time gap is T_L. In this way the number of samples consisting of (TPVL, LV) is extended from T*f_sl to T_L*Tf_sl.

Step 2: the TS is used in step b) of the method.

A different training set is created with each of the cases A to C. Each of them leads to a different soft sensor in the end.

Hence, in the above shown procedure three different training sets in total or three different soft sensors in total can be created.

The determination and the handling of outliers is always a critical point. An outlier may be due to variability in the measurement or it may be the result of an instrumental error; the latter are sometimes excluded from the data set. In general, and in particular in statistics, an outlier is considered a data point that differs significantly from other observations, which however leaves much space for subjective interpretation and misinterpretation. On the other hand, the inclusion of data points at the fringes of a data set is necessary for a meaningful and robust calibration and therefore, should not be simply skipped just because they appear to be odd. This already shows that one, if not the major problem associated with outliers is their detection or identification because there is no rigid definition of an outlier. Ultimately, it is therefore still a subjective exercise to determine if an observation is an outlier or not. Due to the lack of a generally accepted definition of an outlier, there are various methods for detecting an outlier. In the context of the present invention, a value, regardless of whether it is a laboratory value LV1, a process value PV1 or a process value PV2, is considered an outlier, when said value has a variance of more than 2 sigma from its expected value. When a measured value has a variance of more than 2 sigma from its expected value, the measurement underlying said value is repeated. In this context the terms variance, 2 sigma and expected value are used as known in stochastic. Specifically, the term 2 sigma comes from the normal distribution, also called Gaussian or Gauss distribution, where the variance, indicated by sigma, describes the width of the standard deviation. Approximately, it applies that 99.45% of all measured values are in the interval of deviation of +/−2 sigma from the expected value.

In a further embodiment of the method according to the present invention the measurement underlying a laboratory value LV1, a process value PV1 and/or a process PV2 value is repeated when the value in question has a variance of more than 2 sigma from its expected value.

Preferably, the threshold value in step e) of the method according to the present invention is given by the relative error. Given some value x and its approximation $\tilde{x}$, the absolute error is $\Delta x = |\tilde{x} - x|$, where the vertical bars denote the absolute value. If $\tilde{x} \neq 0$, the relative error is $$\eta = \frac{\Delta x}{x} = \left|\frac{x - \tilde{x}}{x}\right| = \left|1 - \frac{\tilde{x}}{x}\right|,$$

and the percent error is $$\delta = 100\% \times \eta = 100\% \times \frac{\Delta x}{x} = 100\% \times \left|\frac{x - \tilde{x}}{x}\right|.$$

In words, the absolute error is the magnitude of the difference between the exact value and its approximation, the relative error is the absolute error divided by the magnitude of the exact value, and the percent error is the relative error expressed in terms of per 100. In principle, the method according to the present invention is not subject to any limitations regarding a specific threshold value. Rather, the threshold value is chosen depending on the estimated variance of the approximated value. Without wishing to be bound to a specific theory, the threshold value in the method according to the present invention is preferably a relative error of 10%.

In addition to the automatic re-calibration of the soft sensor in step f), it is also possible to trigger said re-calibration of the soft sensor in case of particular incidents. For example, one may ask for an automatic re-calibration periodically in pre-defined intervals or non-periodically in pre-defined stages of the chemical process or when changing from one stage to another. For example, pre-defined stages of a chemical process can be the start-up phase, the continuous or batch-wise operation and/or the shup-down phase of a production process. An example for changing from one stage to another is the change from a continuous to a batch-wise operation. Other examples for pre-defined stages of a chemical process can be the individual phases of a purification process, such as the individual phases of separation of a mixture of substances based on the different boiling points of the individual components in a distillation process or based on the different mobility of individual components in a colloidal matrix.

In an embodiment of the method according to the present invention the step f) is also performed periodically in pre-defined intervals or non-periodically in pre-defined stages of the chemical process or when changing from one stage to another.

In addition or in alternative to the automatic re-calibration of the soft sensor in step f) one may also ask for manual triggering of the re-calibration of the soft sensor.

In an alternative embodiment of the method according to the present invention the step f) is triggered whenever deemed necessary.

According to the present invention, the soft sensor is re-calibrated by the sequence of f1) augmenting the training set TS1 of step a) with further laboratory values LV1 and/or further process values PV1

During re-calibrating of the soft sensor in step f), the training set TS1 of step a) is augmented with further laboratory values LV1 and/or further process values PV1 to provide a new training set TS2. Hence, step f) also involves the collecting of further laboratory values LV1, process values PV1 and process values PV2, to put said values in chronological sequence and framework, and the linking of the respective values correlated to one another. All these sub-steps are performed in the same way as described in steps A1) to A4) above. Therefore, the linking of the further values in the step A4) also allows to provide to separate training set TS2, which least partially or completely replaces the training set TS1.

In another embodiment of the method according to the present invention the training set TS1 is replaced in step f) at least partially or completely with the training set TS2.

The conditions in a chemical process are subject to steady changes, in particular the conditions in the start-up phase of a chemical process, e.g. in the beginning of the chemical reaction practiced in the process, often differ significantly from the conditions in a later phase of a chemical process, e.g. in a stabilized chemical reaction or a stabilized chemical process in general. Thus, if the training set TS1 is partially replaced by the training set TS2 in step f), it is preferred to replace that part of the training set TS1, which represents the oldest conditions of the respective chemical process, i.e. the part of the training set TS1 having values of the oldest time stencils, with the latest values, i.e. the laboratory values LV1 and/or the process values PV1 having current time stencils.

In a preferred embodiment of the method according to the present invention the laboratory values LV1 and/or the process values PV1 having the oldest time stencils are replaced with laboratory values LV1 and/or the process values PV1 having current time stencils.

Preferably, the laboratory values LV1 and/or the process values PV1 having the oldest time stencils are replaced in step f) at least partially or completely with laboratory values LV1 and/or the process values PV1 having current time stencils.

Considering the often significantly different conditions in specific stages of a chemical process, it is reasonable to replace the training set TS1 at least partially or completely with the training set TS2 in pre-defined stages of the chemical process, e.g. after the start-up phase, at the shut-down phase etc. Alternatively, it is also reasonable to replace the existing training TS1 at least partially or completely with the training set TS2, when the step f) has been executed more frequently than it is considered acceptable, i.e. when the number of executions of step f) within a pre-defined time period excess a defined threshold. In general, the method according to the present invention is not subject to any limitations regarding the threshold in step f). Rather, the threshold is chosen adequately under consideration of the framework conditions of the individual chemical process and the requirements to be met.

In a further embodiment of the method according to the present invention the training set TS1 is replaced at least partially or completely with the training set TS2 in pre-defined stages of the chemical process or when the number of performances of step f) within a pre-defined time period exceeds a defined threshold.

According to the present invention a processing unit is trained on a training set to provide a calibration function. Typically, the processing unit is an artificial neural network. In the context of the present invention the term neural network is used synonymous with the term artificial neural network (ANN) and denotes a computing system that is inspired by, but not identical to, biological neural networks that constitute animal brains. Specifically, An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. For example, the layer that receives external input, such as process value PV2, is the input layer. The layer that produces the ultimate result, i.e. the predicted operating parameter approximated to LV1 and/or PV1, is the output layer. In between them are hidden layers. Between two layers, multiple connection patterns are possible.

In an embodiment of the method according to the present invention the processing unit is an artificial neural network.

The artificial neural network can be a deep neural network, a recurrent neural network or a convolutional neural network, depending on the specific framework conditions of the respective chemical process and the requirements to be met.

In the context of the present invention the term deep neural network or its abbreviation DNN is used as known to the person skilled in the art and denotes an artificial neural network with multiple layers between the input and output layers. There are different types of neural networks but they always consist of the same components: neurons, synapses, weights, biases, and functions. These components function similar to the human brains and can be trained like any other machine learning algorithm.

However, as with many artificial neural networks, many issues can arise with naively trained DNNs. Two common issues are overfilling and computation time. DNNs are prone to overfilling because of the added layers of abstraction, which allow them to model rare dependencies in the training data. In statistics, overfitting is the production of an analysis that corresponds too closely or exactly to a particular set of data and may therefore fail to fit additional data or predict future observations reliably. An overfilled model is a statistical model that contains more parameters than can be justified by the data. The result of overfitting is to have unknowingly extracted some of the residual variation, i.e. the noise as if that variation represented the underlying model structure. In other words, the thus obtained model remembers a huge number of examples instead of learning to notice features. Further, DNNs must consider many training parameters, such as the size (number of layers and number of units per layer), the learning rate, and initial weights. Sweeping through the parameter space for optimal parameters may not be feasible due to the cost in time and computational resources.

Here, the use of a convolutional neural network (CNN) can help. The term convolutional neural network or its abbreviation CNN is used as known to the person skilled in the art and denotes a class of deep neural networks that employs a mathematical operation called convolution in place of general matrix multiplication in at least one of their layers. CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme. Accordingly, CNNs are less prone to overfitting, they require less computation resources and less training data than other artificially neural networks. In the context of the present invention the need for less training data is big advantage because in chemical processes, where samples are taken sometimes just once in an hours, the collected data is smaller than in other disciplines. Nevertheless, the use of convolutional neural networks allows to get high quality prediction models, calibration functions and soft sensors.

It is therefore preferred that the artificial neural network is a convolutional neural network.

In the context of the present invention the term recurrent neural network or its abbreviation RNN is used as known to the person skilled in the art and denotes a class of artificial neural networks where connections between nodes form a directed graph along a temporal sequence. This allows it to exhibit temporal dynamic behavior. The term "recurrent neural network" is used indiscriminately to refer to two broad classes of networks with a similar general structure, where one is finite impulse and the other is infinite impulse. Both classes of networks exhibit temporal dynamic behavior. A finite impulse recurrent network is a directed acyclic graph that can be unrolled and replaced with a strictly feedforward neural network, while an infinite impulse recurrent network is a directed cyclic graph that cannot be unrolled. Both finite impulse and infinite impulse recurrent networks can have additional stored states, and the storage can be under direct control by the neural network.

Figure 2:
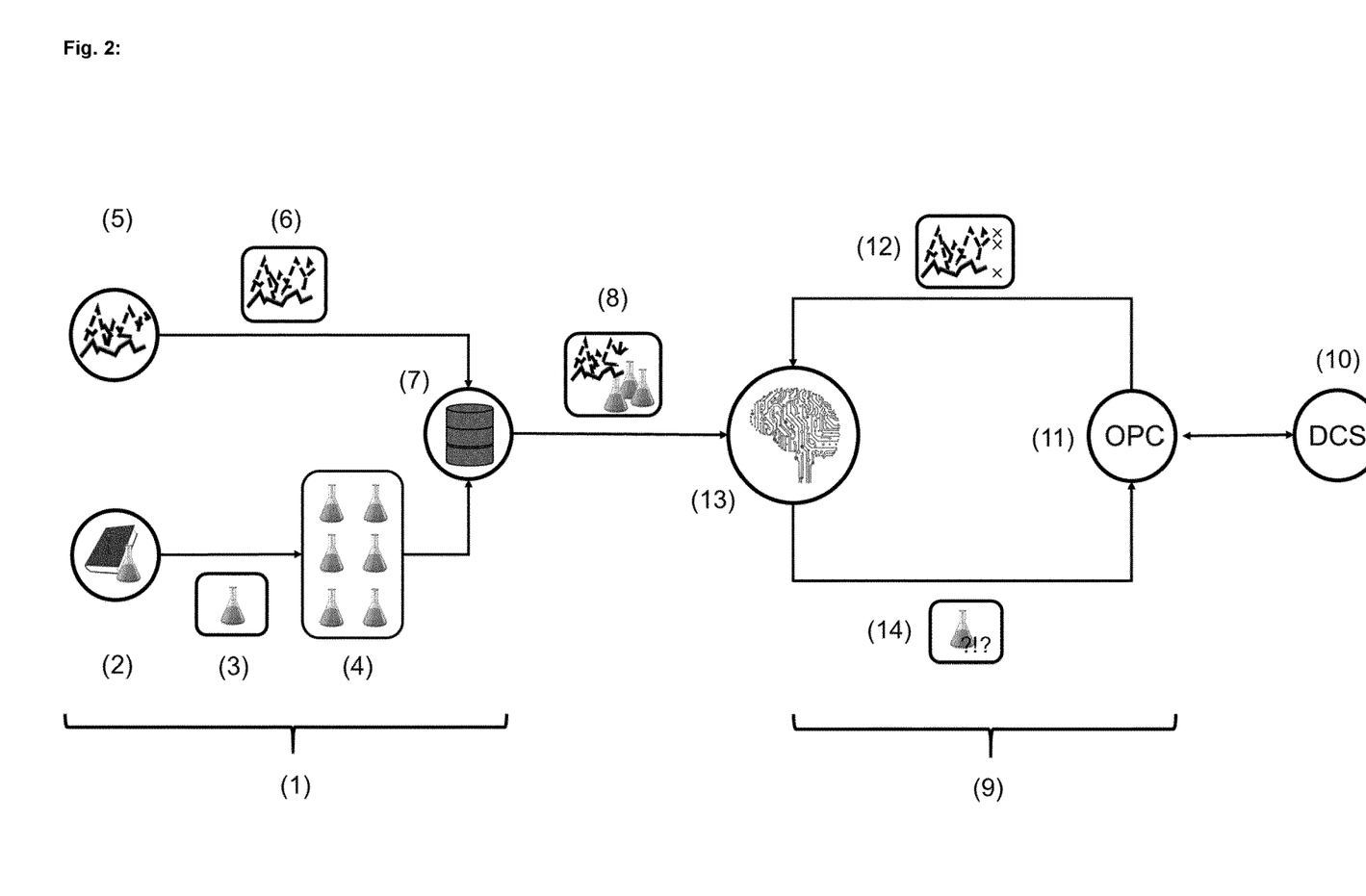
FIG. 2 is a schematic representation of the method and the device according to the present invention, in which the individual numbers have the following meanings (1) calibration branch, process information management system (PIMS) (2), laboratory values (3), laboratory value buffer (4), process information management system (PIMS) (5), process values (6), collector (7), training set (8), operation loop (9), distribution control system (DCS) (10), open platform communications (OPC) (11), process value (12), processing unit (13), and predicted operating parameter (14).

According to the present invention, a processing unit is trained on a training set TS1 to generate a calibrated soft sensor based on a calibration function CF1. In a framework for controlling a chemical process by means of the method according to the present invention, this training set TS1 may be provided by a calibration branch (1) for generating a calibration function, comprising a laboratory management system (LIMS) (2), which provides the laboratory values LV1 (3), and a process information management (PIMS) (5) for providing process values PV1 and/or PV2 (6). For example, a so-called laboratory information management system (LIMS) is polled for laboratory values, which come from an experiment run in a laboratory representing the process in question. A training set (8) is created by linking a laboratory value LV1 to a corresponding process value PV2. Alternatively, it is also possible to collect process values PV1 being correlated to at least one process value PV2 to create a training set by linking a process value PV1 to an appropriate process value PV2. Providing every collected value with a time stencil facilitates the linking of a laboratory value LV1 to an appropriate process value PV2 or of a process value PV1 to an appropriate process value PV2. Said time stencil indicates the point in time at which the respective value was recorded and/or at which the sample underlying the said value was recorded. The thus generated training set (8) is then used to train the processing unit (13) to generate a calibration function that allows the processing unit to perform the prediction of operating parameters as approximation to a laboratory value LV1 and/or process value PV1.

According to the present invention at least one operating parameter is predicted as approximation to laboratory values LV1 and/or process values PV1 for the chemical process with one or more process values corresponding to process values PV2. In a framework for controlling a chemical process by means of the method according to the present invention, said one or more process values can be provided by an operating loop (9), which requests process parameters PV2 (12) from the distribution control system (DCS) (10) of the chemical process.

A processing unit (13) adapted to carry out the method according to the present invention is placed between the calibration branch (1) and the operation loop (9). Thus, the processing unit (13) is connected to the calibration branch (1) providing said processing unit with the necessary laboratory values LV1, and processing values PV1 and/or PV2 for generating the calibration function, and the operating loop (9) providing the processing unit with the necessary process values PV2 with which the predictions of the at least one operating parameter as approximation to LV1 and/or PV1 are made.

Another object of the method according to the present invention is a system for controlling a chemical process, comprising i) a calibration branch (1) for generating a calibration function, comprising a laboratory information management system (LIMS) (2) for providing laboratory values LV1 (3), and a process information management system (PIMS) (5) for providing process values PV1 and/or PV2 (6), ii) an operation loop (9) for requesting one or more process values (12) from the distributed control system (DCS) (10) of the chemical process, and iii) a processing unit (13) adapted to carry out the method according to the present invention, wherein the processing unit is connected to the calibration branch (1) and the operation loop (9).

Preferably, the system according to the present invention is for controlling a preparation of methanol, hydrogen sulfide, methyl mercaptan, hydrocyanic acid, acrolein, 3-methylthiopropionaldehyde, methionine, a salt of methionine, or a derivative of methionine.

In an embodiment of the device according to the present invention the processing unit is an artificial neural network. Said artificial neural network can be a deep neural network, a recurrent neural network or a convolutional neural network, depending on the specific framework conditions of the respective chemical process and the requirements to be met. Preferably, the processing unit is convolutional neural network.

Optionally, the calibration branch further comprises a laboratory value buffer (4) into which a laboratory value (3) is transferred after its recording. When the laboratory value buffer is full, corresponding process values PV2 (5) will be collected by a collector (7) from the process information management system (5) for each laboratory value and a training set be created by linking a laboratory value LV1 and/or a process value PV1 to a matching process value PV2.

The predicted operating parameter (14) is then written into the distribution control system (10) of the chemical process by means of the open platform communications (11).

The present invention is further illustrated by means of the FIGS. 1 to 4 and the examples.

COMPARATIVE EXAMPLE

Figure 3:
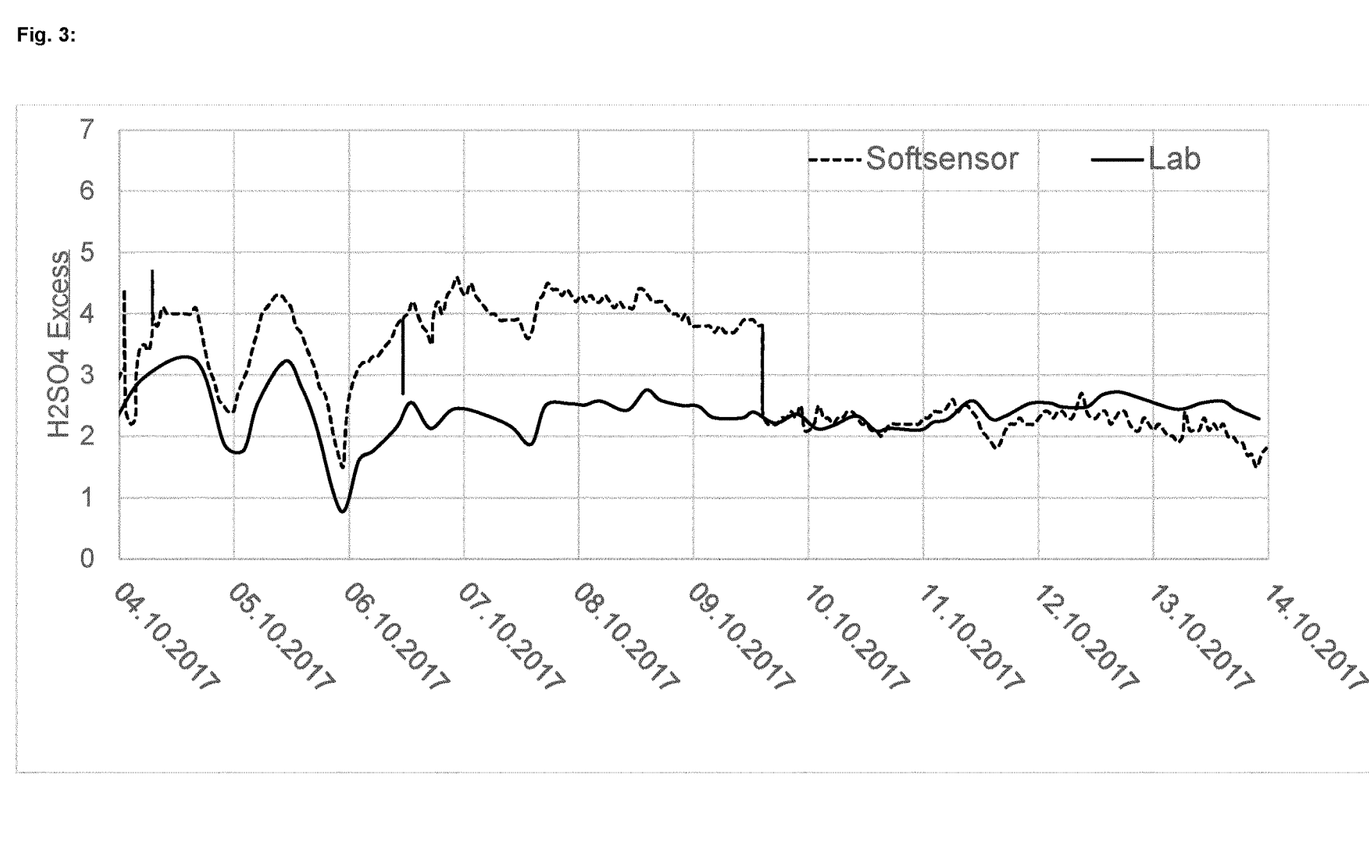
FIG. 3 is a diagram of the results of the comparative example.

The excess of sulfuric acid in the ammonia scrubber downstream the reactor for producing hydrogen cyanide was predicted by means of a soft sensor without re-calibration. Besides, the excess of sulfuric acid was simultaneously also measured as real value. FIG. 3 is diagram of the results of the prediction and the real measurement with the values of excess sulfuric acid, in one instance measured in the laboratory (continuous black line, lab) and in the other case approximated by a soft sensor of the prior art (dotted black line, soft sensor), the first ellipsis (broken black line, left) indicates a spiking and the second ellipsis (broken line, right) indicates an offset correction. As visible in the FIG. 3, the process values predicted by soft sensor approached the real measured value. After an initially significant deviation the predicted values followed the trend of the measured values but however they never were consistent with the measured values. Rather, after a period of synchronicity the predicted values started to differ more strongly from the real values and an offset correction had to be performed due to the strong discrepancy between predicted and real numbers.

Example 1 According to the Invention

Figure 4:
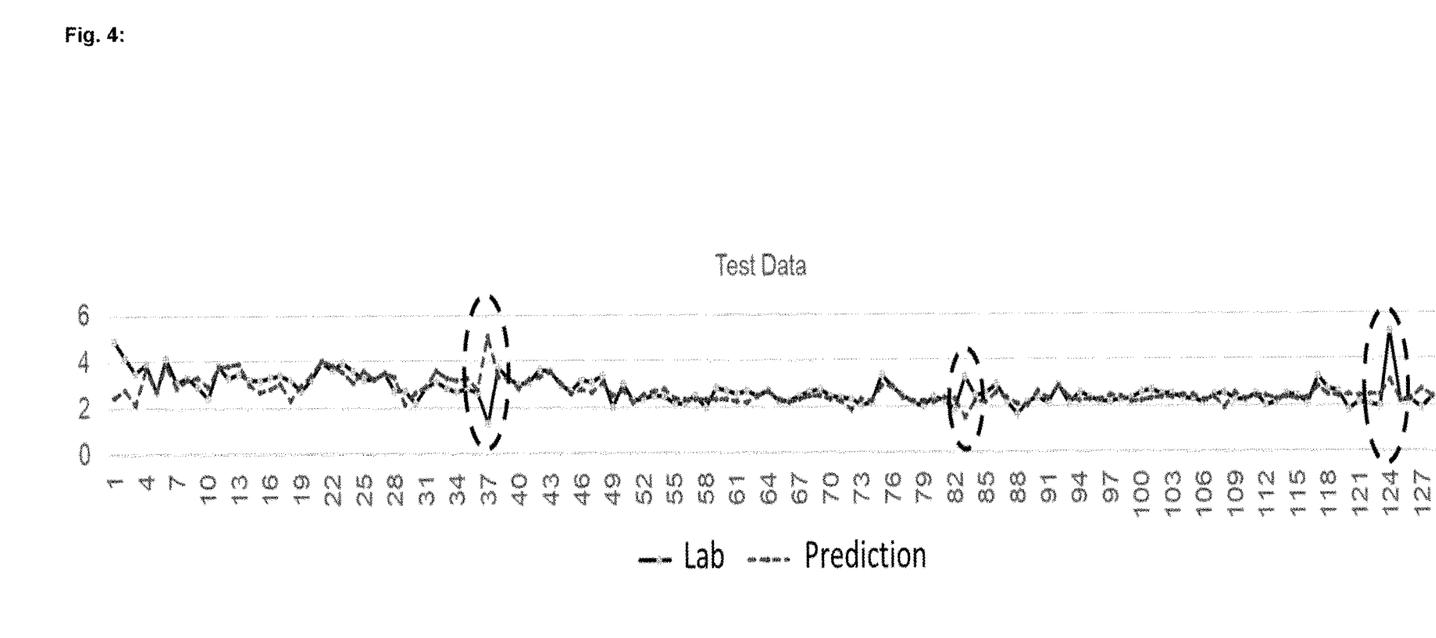
FIG. 4 is a diagram of the results of example 1 according to the invention.

The excess of sulfuric acid in the ammonia scrubber downstream the reactor for producing hydrogen cyanide was predicted by means of the method according to the present invention. Besides, the excess of sulfuric acid was simultaneously also measured as real value. FIG. 4 is diagram of the results of the prediction and the real measurement with the values of excess sulfuric acid, in one instance measured in the laboratory (continuous black line, Lab), and in the other case approximated by the method according to the present invention (dotted grey line, Prediction), the three ellipses indicate a difference between approximated and real values and the immediate correction. As visible in the FIG. 4, the process values predicted by the method according to the present invention had a much better agreement with the real measured value. Further, the method according to the present invention was also able to identify a discrepancy between the predicted and the real value rather quickly and to re-calibrate the soft sensor so that there was again a very good consistency of the predicted and the real values shortly after the identified deviation.

Example 2 According to the Invention

Figure 5:
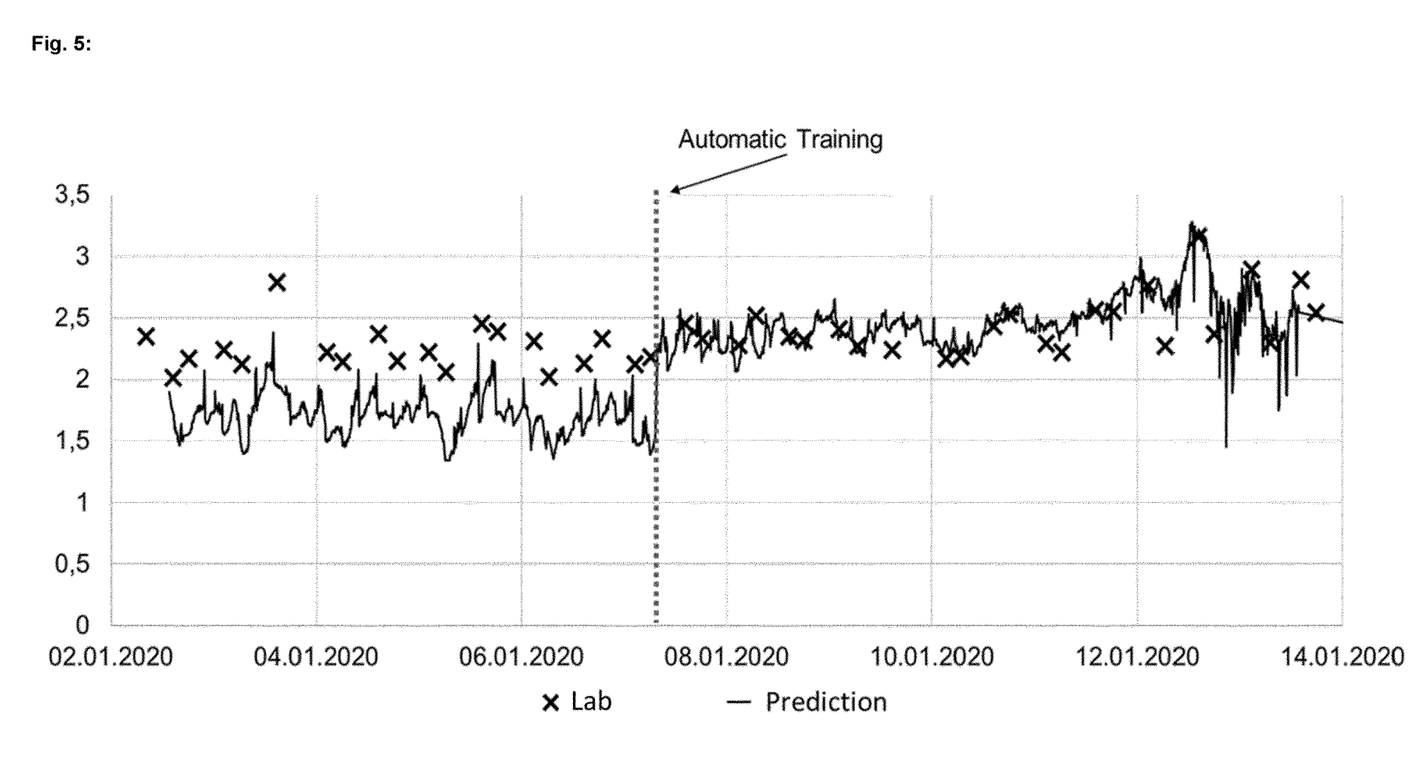
FIG. 5 is a diagram of the results of example 2 according to the invention.

This example shows the recalibration of the soft sensor in the method according to the present invention. Again, the excess of sulfuric acid in the ammonia scrubber downstream the reactor for producing hydrogen cyanide was predicted by means of the method according to the present invention and measured in a laboratory. However, in comparison to Example 1, the production of hydrogen cyanide was shut down and then started again. After the re-start, the calibration function of the soft sensor did not match the situation in the process any more. Consequently, there was a large offset between the values for sulfuric acid measured in the laboratory and the predicted values for sulfuric acid. This large offset is visible in the FIG. 5 from day 02.01.2020 until day 08.01.2020. However, once the automatic training, i.e. the re-calibration of the soft sensor, was initiated (indicated by the dotted line) the prediction of the sulfuric acid values improved significantly. There was no offset visible any longer, from day 08.01.2020 onwards. In the rare cases of a difference between predicted and real values, the soft-sensor re-calibrated automatically again, and the predicted values were again in very good consistency with the real values. The results are shown in FIG. 5 with the values of excess sulfuric acid, in one instance measured in the laboratory (crosses, Lab), and in the other case approximated by the method according to the present invention (full black line, Prediction).

Figure 6A:
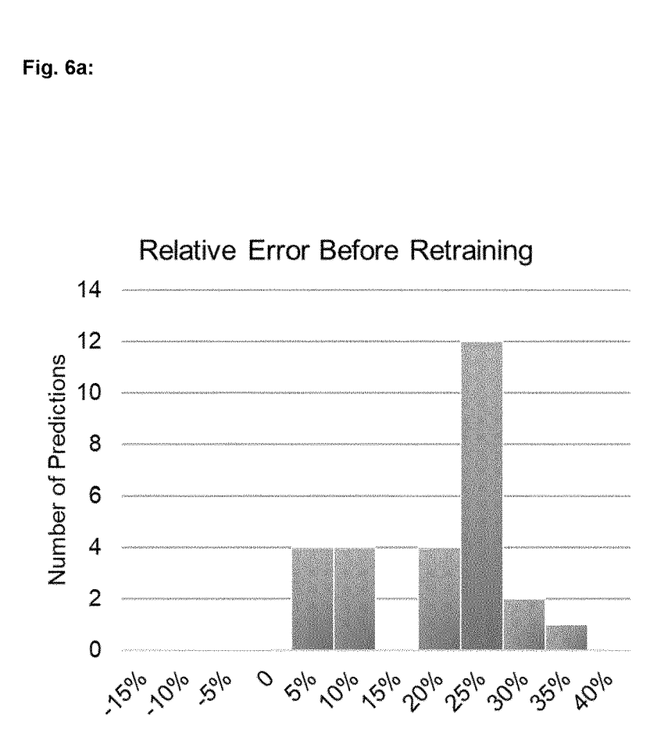
FIG. 6a is the relative error in prediction of a soft sensor not according to the invention.
Figure 6B:
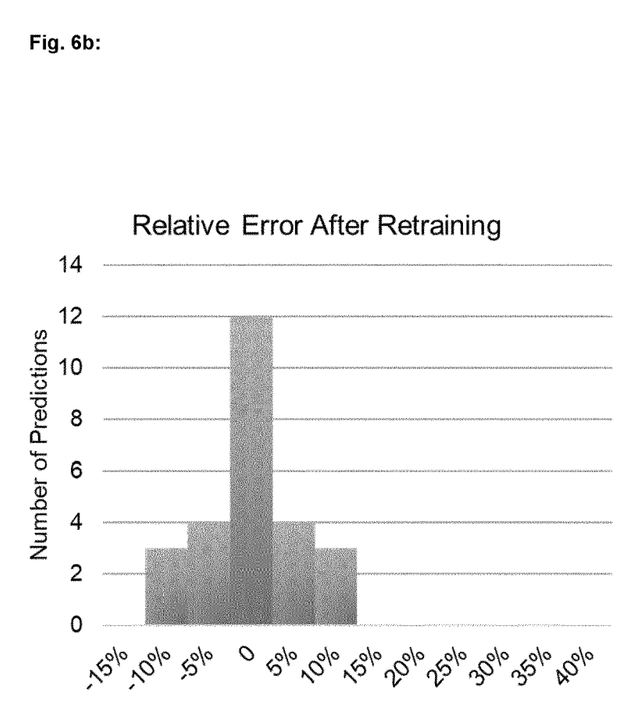
FIG. 6b is the relative error in prediction of an automatically re-calibrating soft sensor according to the invention.

FIGS. 6a and 6b show the relative error in prediction before the re-calibration, i.e. before retraining, was initiated (FIG. 6a) and after initiation of the re-calibration, i.e. after retraining (FIG. 6b). The FIG. 6a shows that a soft sensor, if trained well, is in general capable of making predictions with an error of prediction between 5% and 35%. However, the relative error before a retraining is rather high, e.g. the relative error of prediction is 25% for 12 prediction, but the relative error is never 0. Further, the relative error of a soft sensor without automatic re-calibration appears to be somewhat chaotic, specifically its distribution is unbalanced, and it does not follow a Gaussian distribution.

By comparison, FIG. 6b shows that an automatically re-calibrating soft sensor leads to an improvement in the relative error after retraining, i.e. initiation of re-calibration, over a soft sensor without re-calibration. Specifically, the relative error of prediction for the automatically re-calibrating soft sensor is between −10% to +10% and thus, significantly lower in terms of absolute values. A major improvement is that the relative error is 0 for the major number of predictions. Further, the error distribution in FIG. 6b is well balanced and follows a Gaussian distribution, in contrast to the error distribution in FIG. 6a.

The invention claimed is:

1. A method for controlling a chemical process, wherein the chemical process is one or more of a preparation of methanol, hydrogen sulfide, methyl mercaptan, hydrocyanic acid, acrolein, 3-methylthiopropionaldehyde, 5-(2-methylmercaptoethyl)-hydantoin, methionine, a salt of methionine, and a derivative of methionine, the method comprising:
a) providing, to a processing circuitry, a training set TS1, wherein the training set TS1 comprises a process value PV1 and a process value PV2 being correlated to one another, and/or a laboratory value LV1 and the process value PV2 being correlated to one another;
b) training an artificial neural network on the training set TS1 of a) to identify a pattern of correlation between one or more measured process variables and at least one process variable, and developing a calibration function CF1 for a calibrated soft sensor disposed on the processing circuitry, from the identified pattern of correlation;
c) predicting, by the processing circuitry, at least one operating parameter for the chemical process as an approximation to LV1 and/or PV1, comprising:
c1) requesting one or more process values corresponding to PV2 from a distributed control system (DCS) of the chemical process, and
c2) predicting an operating parameter with the one or more process values of c1) by the calibrated soft sensor of b);
d) calculating, by the processing circuitry, a deviation, the deviation being a difference between the operating parameter predicted in c2) and a corresponding laboratory value LV1 and/or the processing value PV1 of the training set TS1 of a);

e) proceeding with f) if the deviation calculated in d) exceeds a threshold value, otherwise proceeding with g),
f) re-calibrating, by the processing circuitry, the soft sensor of b), comprising:
  f1) augmenting the training set TS1 of a) with further laboratory value LV1 and/or further process value PV1 or replacing at least a part of the training set TS1 with the further laboratory value LV1 and/or further process value PV1 to provide a training set TS2, and
  f2) training the artificial neural network on the augmented training set TS1 or on the training set TS2 of f1) to revise the calibration function CF1 of b), and
  f3) re-calibrating the soft sensor of b) by the revised calibration function of f2), and
  f4) returning to step c) with the re-calibrated soft sensor of f3);
g) writing, by the processing circuitry, the at least one operating parameter predicted in c2) into the DCS;
h) repeating c) to g) while using the DCS and the at least one operating parameter predicted in c2) to regulate a chemical process, the chemical process being performed by a chemical synthesis device and comprising one or more of a preparation of methanol, hydrogen sulfide, methyl mercaptan, hydrocyanic acid, acrolein, 3-methylthiopropionaldehyde, 5-(2-methylmercapto-ethyl)-hydantoin, methionine, a salt of methionine, and a derivative of methionine,
  wherein the DCS is configured to automatically adjust a controllable parameter of the chemical process according to the at least one predicted operating parameter.

2. The method according to claim 1, wherein a) and/or f1) further comprises:
  A1) collecting laboratory values LV1 and process values PV2, and/or process values PV1 and process values PV2;
  A2) providing each value of A1) with a time stencil indicating a point in time at which the value was recorded and/or a sample underlying the value that was taken;
  A3) providing each laboratory value LV1 and/or each process value PV1 with a time pattern, going back in time from a time stencil of LV1 and/or PV1 for a pre-defined time span; and
  A4) linking the laboratory value LV1 and/or the process value PV1 to one or more process values PV2 having a time stencil matching the time pattern of the laboratory value LV1 and/or the time pattern of the process value PV1.

3. The method according to claim 1, wherein:
the process value PV1 and the process value PV2 are correlated to one another when the process value PV1 is dependent or influenced by the process value PV2, or vice versa, and/or
the laboratory value LV1 and the process value PV2 are correlated to one another, when the laboratory value LV1 is dependent or influenced by the process value PV2, or vice versa.

4. The method according to claim 1, wherein the process values are current values or averaged values.

5. The method according to claim 4, wherein the averaged values are obtained by averaging aggregated process values over a pre-defined time span.

6. The method according to claim 4, wherein the averaged values are obtained by averaging aggregated process values over a pre-defined time span of A4).

7. The method according to claim 1, wherein a measurement underlying the laboratory value LV1, the process value PV1 and/or the process value PV2 is repeated when the value has a variance of more than 2 sigma from its expected value.

8. The method according to claim 1, wherein f) is also performed periodically in pre-defined intervals or non-periodically in pre-defined stages of the chemical process or when changing from one stage to another.

9. The method according to claim 1, wherein f) is triggered at pre-defined time intervals.

10. The method according to claim 1, wherein the training set TS1 is replaced in f) at least partially or completely with the training set TS2.

11. The method according to claim 10, wherein a laboratory value LV1 and/or a process value PV1 having an oldest time stencil are replaced with a laboratory value LV1 and/or a process value PV1 having a current time stencil.

12. The method according to claim 1, wherein the training set TS1 is replaced at least partially or completely with the training set TS2 in pre-defined stages of the chemical process or when a number of performances of f) within a pre-defined time period exceeds a pre-defined threshold.

13. The method according to claim 1, wherein the artificial neural network is a convolutional neural network.

14. A system for controlling a chemical process, comprising:
  a calibration branch for generating a calibration function, comprising:
    a laboratory information management system (LIMS) for providing laboratory values LV1, and a process information management system (PIMS) for providing process values PV1 and/or PV2;
  an operation loop for requesting one or more process values from a distributed control system (DCS) of the chemical process; and
  a process control circuitry adapted to carry out the method of claim 1, wherein the process control circuitry is connected to the calibration branch and the operation loop.

* * * * *